United States Patent [19]

Bargman

[11] 4,445,457

[45] May 1, 1984

[54] DIFFERENTIAL PRESSURE INDICATOR

[76] Inventor: Ronald D. Bargman, 1517 Ferris, Royal Oak, Mich. 48067

[21] Appl. No.: 311,779

[22] Filed: Oct. 15, 1981

[51] Int. Cl.³ .............................................. G01L 1/02
[52] U.S. Cl. .................................................. 116/268
[58] Field of Search ................ 116/268, 272; 137/556, 137/557

[56] References Cited

U.S. PATENT DOCUMENTS

| | | | |
|---|---|---|---|
| 2,954,751 | 10/1960 | Barnes | 116/268 |
| 3,358,836 | 12/1967 | Schmitt | 116/268 |
| 3,411,475 | 11/1968 | Sheff | 116/272 |
| 3,654,414 | 4/1972 | Kudlaty | 116/268 |
| 4,366,717 | 1/1983 | Foord et al. | 116/268 |

*Primary Examiner*—Charles Frankfort
*Assistant Examiner*—David R. Schuster

*Attorney, Agent, or Firm*—John R. Benefiel

[57] ABSTRACT

A differential pressure indicator is disclosed, providing an indication upon detection of a predetermined level of differential pressure in a fluid pressure system. The device includes a piston mounted to a rolling lip diaphragm, with the differential pressure exerted across the piston, which is thereby moved against the resistance of a bias spring from a non-display position to a display position upon development of the predetermined differential pressure. The piston is viewable in the display position through a 360° window formed integrally with the housing or by a separate transparent ring assembled into the housing. Valving may also be controlled by the piston movement, enabling communication of fluid pressure to an outlet port for activation of a fluid pressure operated audible signal or other indicator device.

5 Claims, 15 Drawing Figures

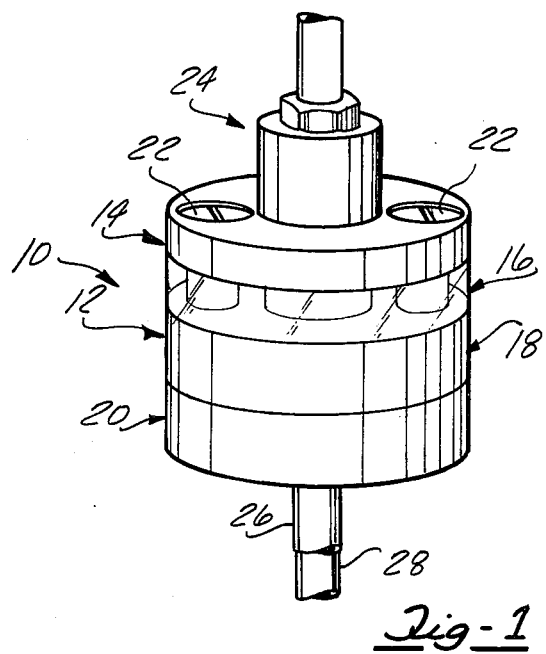
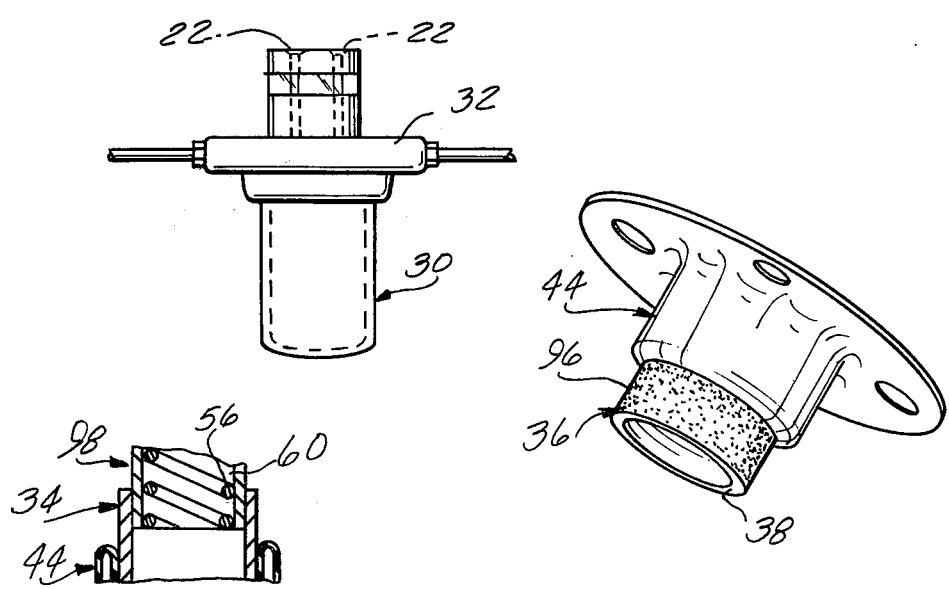

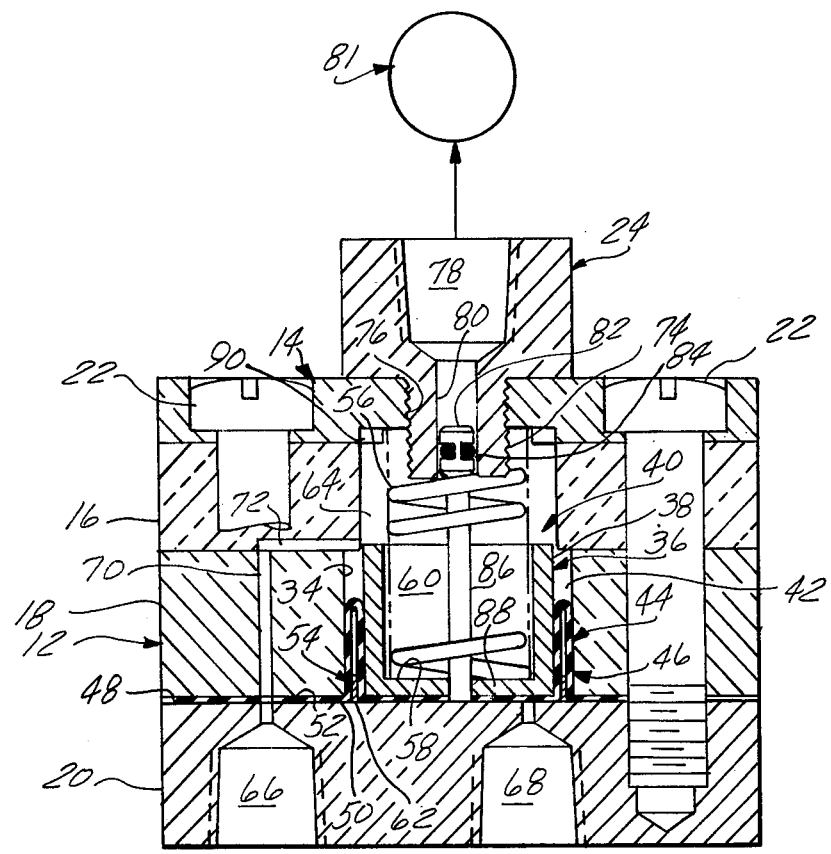
_Fig-3_
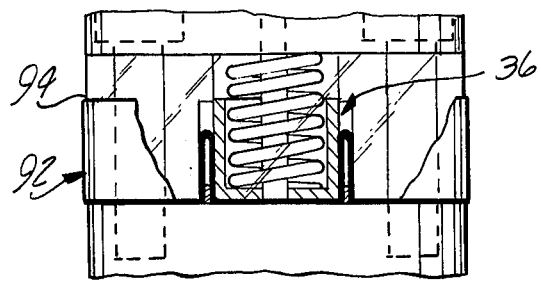
_Fig-4_
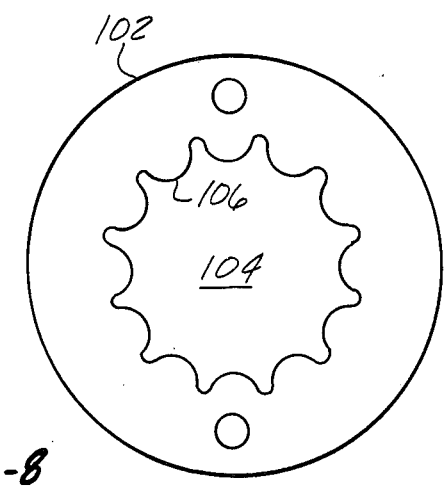
_Fig-8_

DIFFERENTIAL PRESSURE INDICATOR

BACKGROUND DISCUSSION

This invention relates to indicators and more particularly to indicators adapted to detect the development of a predetermined difference between fluid pressures in a system, and the providing of an indication whenever the differential fluid pressure reaches the predetermined level. Such devices have wide-spread application to filters, since the clogging of a filter results in the development of an excessive pressure drop across the filter due to the increased resistance to fluid flow created by the filter clogging. This enables maintenance to be timely performed on the filter, avoiding equipment failures and needless power consumption.

While satisfactory devices have long been available for small scale use, there have been increasingly widespread industrial applications for such devices, where the cost of the device is of much more importance than for the uses for which such devices have been commonly employed in the past, such as for laboratory experiments.

The typical differential pressure indicators which have been heretofore employed commonly use elements such as a bellows, diaphragm, or piston subjected to the differential pressure to be detected and a separate complex mechanism operated by the piston such as a magnetic or mechanical coupling to an indicator device.

This produces a mechanism of some complexity and cost.

Another requirement is a high degree of reliability in functioning of the indicator. Filters are usually located within industrial plants in remote locations and may only seldomly be triggered. If there is significant internal friction in the functioning of the moving parts, the variations in friction may produce a wide variation in the differential pressure which will trigger the indicator. Such wide variation may lead to malfunctioning in which a clogged filter goes undetected, possibly causing costly equipment failure.

The location of the filter installation may be remote and surrounded with other equipment so it is also important that such differential pressure indicator be viewable from various angles and distinctly seen when the differential pressure detected reaches the predetermined level at which the visual or other indication is to be given. It is thus highly desirable that a 360° viewing angle for visual indicators be incorporated.

A problem for visual type indicators is the need to avoid excessive pressures being applied to a window or bubble of transparent plastic or glass since if relatively high pressures are employed, this could create a hazard due to possible shattering of the window. This design problem has contributed to the complexity and cost of prior art devices either due to the need for a high strength window and/or the necessity for an interposed mechanism between the fluid pressure device and the indicator element which moves into view.

The remoteness of some of these installations make desirable a capability for an indication other than visual, or for a remote visual, such as an audible signal or an electric panel light indication.

Accordingly, it is an object of the present invention to provide a differential pressure indicator which provides an indication upon achievement of a predetermined differential pressure which is of extremely simple configuration such as to be manufactured at relatively low cost while at the same time providing a high degree of accuracy and reliability in its operation.

A further object of the present invention is to provide a differential pressure indicator of the visual type enabling 360° viewing which does not involve complex mechanical or magnetic coupling between the indicator element and the element subjected to the differential pressure, but at the same time does not create an undue hazard of shattering the viewing window.

It is still another object of the present invention to provide such differential pressure indicator with an added capability of providing a pneumatically operated indicator device such as an audio or electrically operated remote visual indication without increasing substantially the complexity of the device.

SUMMARY OF THE INVENTION

These and other objects of the present invention which will become apparent upon a reading of the following specifications and claims are achieved by the differential pressure indicator consisting of a piston directly coupled to a flexible diaphragm having a rolling lip central portion which surrounds one end of the piston and a bore formed in a housing. The piston is secured to the diaphragm central portion by a retaining ring so as to move from a non-indicating to an indicating position upon development of a predetermined differential pressure across the diaphragm and piston with a visual display being provided by any of several alternative methods.

In one embodiment, the piston moves upon development of the predetermined pressure differential into the central opening of a transparent viewing ring located at one end of the housing bore, the piston being appropriately brightly colored to be readily visible within the ring. This arrangement allows 360° viewing. The viewing ring central opening may be constructed with semi-circular protuberances, creating a magnifying effect, enhancing the visibility of the piston.

In other embodiments, the housing is formed of a transparent material and masked to hide the piston in its rest, or non-indicating, position, but allows viewing of the piston as it is moved to its second or indicating position.

In another embodiment using a transparent housing, the piston is progressively uncovered by the rolling lip of the diaphragm, with that portion of the piston being appropriately colored to provide the visual indication.

In yet another embodiment, there is provided an element appropriate colored with a "normal" condition color, such as green, which element is covered by movement of the piston to the indicating position, the piston being hollow and open-ended to receive and cover the "normal" indicator element.

The rolling lip of the diaphragm in the clearance space produces a substantially non-frictional contact between the piston and the surrounding bore such as to provide a high degree of reliability due to the minimal friction.

At the same time the confining effect of the rolling lip interposed between the clearance space between the piston and the bore provides a reliable centering and positioning of the piston within the bore and free axial movement upon the application of the predetermined differential pressure.

Bias means urges the piston into its first or non-indicating position, this means consisting of the compression spring received within the open end of the piston to provide a compact arrangement. In an alternate embodiment, a telescoping volute spring is employed, which may be colored to indicate a normal condition, since it is covered by movement of the piston to the indicator position.

The forward or leading end of the piston may be received within the central opening of the transparent viewing ring, which opening is of smaller diameter than the housing bore to provide a piloting of the free end of the piston.

In one embodiment, the indicator construction includes the transparent ring which is assembled to a cylindrical housing element and with an end cap at one end and a base at the other end to provide a simple configuration of these parts which may be secured together by machine screws. The indicator alternatively may be secured directly to a filter housing in which case the filter housing forms the base.

Appropriate inlet passages are provided to communicate the respective fluid pressures to internal chambers formed within the housing on either side of the flexible diaphragm to provide a means for subjecting the piston to the differential pressure to be detected. In an alternate embodiment, a spacer ring formed with suitable porting openings enables reversal of the high and low pressure ports.

The piston may also carry a valve and stem which extends within the compression spring and into a valve seat carried in a valve cylinder secured to the cap and which communicates with one of the fluid pressure chambers above the piston and diaphragm. Upon movement of the piston to the indicating position, the valve is unseated such as to supply air pressure to an outlet port which in turn may be connected to a suitable indicating device such as a whistle or fluid pressure operated switch controlling energization of a panel light. The piston may drive the stem either by a direct connection, or by a retainer cap positioned against a piston endwall by the spring.

The mounting components may be of oval shape, with the ring member sealed between projections to minimize the ring size.

BRIEF DESCRIPTION OF THE DRAWINGS

FIG. 1 is a perspective view of the indicator device according to the preferred embodiment of the present invention.

FIG. 2 is a perspective view of an alternative installation of the differential pressure device according to the present invention which is directly associated with a filter as shown.

FIG. 3 is an enlarged sectional view of the differential pressure indicator shown in FIG. 1, with connecting machine screws shown 90° out of position.

FIG. 4 is a sectional view of an alternative embodiment of the differential pressure indicator according to the present invention.

FIG. 5 is a perspective enlarged view of the piston and diaphragm elements of an alternative embodiment of the present invention.

FIG. 7 is a partial sectional fragmentary view of the piston and diaphragm elements depicting a "normal" condition element associated therewith according to an alternative embodiment of the present invention.

FIG. 8 is an enlarged plan view of a viewing ring of alternative construction.

DETAILED DESCRIPTION

Figure 6:
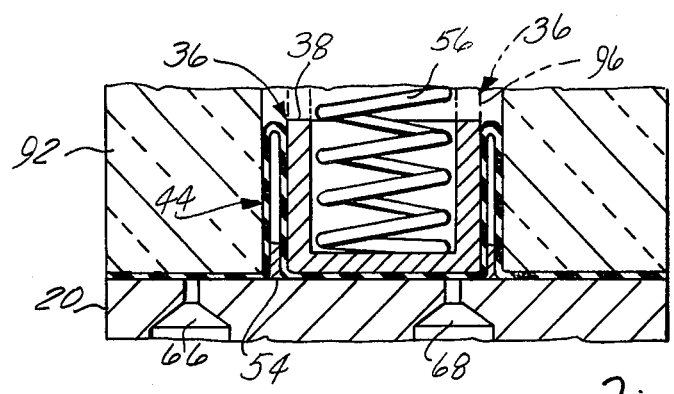
FIG. 6 is a fragmentary sectional view of an alternate embodiment of an indicator device according to the present invention, utilizing the piston diaphragm shown in FIG. 5.

Referring to the drawings and particularly FIG. 1, the differential pressure indicator 10 includes a housing generally indicated at 12 formed of an endplate 14, a transparent ring 16 forming a 360° viewing window, an opaque body member 18 and a base 20. Each of these components are of flat, plate-like configuration and are all assembled in a stacked concentric relationship and secured together with a pair of machine screws 22 extending through each of the components and threadably received in the base 20. An optional feature of the present invention is the addition of an outlet port which has associated therewith valving means controlling communication of fluid pressure to a second indicator device such as a whistle or pneumatically operated switching. Valving and porting is contained within a valve cylinder 24 shown threadably mounted into the endcap 14, but which could be molded as one piece therewith. Suitable fluid pressure connections are provided via fluid pressure lines 26 and 28 to be received into ports to be described.

The differential pressure indicator 10 may be directly mounted onto a filter structure as shown in FIG. 2, in which case the base plate 20 is not employed but rather the upper housing member 32 of the filter assembly 30 functions as the base plate, with the machine screws 22 being threadably received within the suitable threaded bores formed in the upper surface thereof, and with suitable porting associated with the cap 32 to provide the appropriate fluid connections.

The fluid inlet lines 26 and 28 may be connected to fluid pressures in any given fluid pressure system in order to detect the development of a predetermined differential between the pressures so connected.

By referring to FIG. 3, the function of the device can be understood. The body member 18 of the housing 12 is formed with an internal passage or bore 34 within which is disposed an element consisting of a piston 36, movable from a first or non-indicating position as shown in FIG. 3 to a second position upward from the first, or non-indicating position, to a second indicating position in which the leading portion 38 of the piston 36 moves within a central opening 40 of the transparent ring 16 such as to be able to be observed in this position exteriorly of the housing 12.

A suitable bright coloration of the portion 38 to make the piston more visible is desirable such as red, bright orange, etc.

The exterior of the piston 36 and the interior of the bore 34 are of different diameters to create a substantial clearance space 42 therebetween. The clearance space is partially occupied by the rolling lip 44 of a flexible diaphragm 46 which is mounted across one end of the bore 34 as shown by having the radially outward portion 48 clamped between the end face 50 of the body member 18 and the endface 52 of the base 20.

The rolling lip 44 occupies the clearance space 42 and is in contact in a surrounding relationship with the outside diameter of the lower or trailing portion of the piston 36 and also with the interior of the bore 34.

The piston 36 is adapted to move together with the central region of the diaphragm 46 by being retained thereon with a suitable metal retaining ring 54 fit over the lower or trailing end of the piston 36 with the rolling lip portion thereof secured therebetween. In addition, cement or double backed tape is preferably used to tightly secure the contacting portion of the diaphragm 46 to the endface of the piston 36. This arrangement provides stability in the radial location of the lower end of the piston and provides a secure seal as will be described for the application of the differential pressure across the piston 36 with out introducing significant friction resisting axial movement of the piston 36 between its first and second positions, thus providing a highly reliable functioning of the device for detection of a predetermined differential pressure.

The piston 36 is biased to its first position by means of a compression spring 56 interposed between the cap 14 and an internal wall 58 of the piston 36. The piston 36 is formed with a recess 60 extending into the leading end 38 of the piston 36 and which received the compression spring 56 to provide a further centering action and a relatively compact arrangement.

The housing 12 has defined therein a first and second fluid pressure chamber which are on either side of the piston 36 in order to apply the differential pressure thereacross. The first chamber is defined by the region 62 below or on one side of the piston and diaphragm 46, while the second chamber 64 is defined by the housing on the other side of the diaphragm 46 on the leading side of the piston 36. Chamber 64 is defined in part by the central opening 40 of the transparent ring 16 such that the ring 16 has exerted thereon one of the fluid pressures. The very secure mounting of the transparent ring 16 being clamped between the endcap 14 and the body member 18 as well as the sides of the transparent ring and the configuration therof enables adequate strength in order to resist these pressures. The strength of the rings may be further increased by using an adhesive or cement sealant at the joints between the cap 14 and the base of the body member 18 to both seal and to provide additional strength resisting outer radial deformation of the transparent ring 16. Gaskets (not shown) and sealant may also be employed, or if the parts are plastic, welding according to well known techniques.

Means are provided for connecting the fluid pressure chambers to the respective fluid pressures to detect the differential. This means includes a low pressure or downstream inlet port 66 and an upstream or high pressure port 68, each threaded to receive suitable fluid pressure connections to the fluid pressure sources in the system.

Alternatively, as described above and shown in FIG. 2, the base plate 20 may be eliminated and the porting contained within the filter housing structure itself.

Internal passage 70 connects with a cross groove 72 machined radially across the one face of the transparent ring 16 and into communication with the second fluid pressure chamber 64. Port 68 communicates directly with the lower or trailing face of the piston 36 and the opposite side of the diaphragm 46. Accordingly, upon making suitable connections, the bias spring 56 acts against any differential pressure which may be generated between the first chamber 62 and second chamber 64 which differential pressure tends to move the piston 36 from the first or non-indicating position to the second or indicating position, until a predetermined differential pressure level is developed which generates sufficient force to overcome the force generated by the compression spring 56.

The leading end 38 of the piston 36 protrudes slightly into the central opening 40 of the transparent ring 60 which is of lesser diameter than the internal bore 34 and acts to provide a very loose piloting of the forward end of the piston in order to insure that the leading end of the piston does not tilt and cause jamming or undue frictional forces to be generated therebetween.

Upon generation of the predetermined differential pressure, the piston 36 leading end 38 moves into the central opening 40 and into abutment against the inside endface of the top-plate of the cap 14.

As described above, it is often desirable to provide a remote or audible indication. Remote indications such as a panel light may be energized by a fluid pressure switch or an audible signal in addition to the visual signal for increased reliability and also for facilitating monitoring or a number of remote locations. According to the concept of the present invention, the fluid pressure indicator 10 is provided with the capability of causing fluid pressure from fluid pressure chamber 64 to be communicated to an outlet port to which may be connected the fluid pressure operated indicator device.

This is shown installed in FIG. 3 and includes the valve cylinder 24 mounted to the cap 14 as previously described, by means of a threaded portion 74 being threadably received in the threaded opening 76. The valve cylinder 24 is provided with an outlet port 78 which is suitably threaded in order to provide connection to an exterior fluid pressure indicator device, depicted diagrammatically at 81 in FIG. 3. The outlet port 78 is in fluid communication with an axially extending valve seat 80 which cooperates with valving means consisting of a valve element 82 disposed within the valve seat 80. Suitable "O" ring seals 84 extend about the valve element 82. Fixed or integral with the valve 82 is a valve stem 86 in turn extending within the interior of the compression spring 56 and connected to the rear wall 88 of the piston 36 such that the valving element 82 moves together with the piston 36. The valve 82 remains in sealing engagement with the valve seat 80 with the piston 36 in its first or non-indicating position and throughout the movement of the piston to the second position until the second position is reached at which point the valving element 82 extends out of valve seat 80 and allowing communication of the fluid pressure chamber 64 with the outlet port 78 and activation of the device 80.

In order to insure that fluid pressure is communicated beneath the endface of the piston, a suitable one or more grooves or slots 90 are provided which allow fluid flow past the clearance space between the piston 36, the central opening 40, and thence through the valve seat 80 to the outlet port 78. Accordingly, by a simple and reliable valving arrangement, a fluid pressure actuated indication may be provided.

There are various means whereby the visual indication may be provided upon movement of the piston 36 from the non-indicating first position to the second position in the bore 34, other than the provision of the separate transparent viewing ring 16. One such arrangement is shown in FIG. 4 in which the ring 16 and base member 18 are formed of a single transparent housing member 92, which may be suitably masked as by an exterior coating or thin sleeve 94 surrounding the base ring 92 in the region whereat the axial length thereof is occupied by the piston member 36. Upon movement of the piston upwardly to the second position its exterior is viewable through the unmasked portion of the base ring 92.

As shown in FIGS. 5 and 6, the masking 94 may be dispensed with by using the piston member 36 as an indicator by applying a suitable coloring to the side surface 96. The forward end 38 is arranged to be substantially entirely recessed from the rolling lip 42 in the first or non-indicating position. Thus upon advancement of the piston 36 from the first to the second position as shown in FIG. 6, the rolling movement of the rolling lip 42 exposes the colored surface 96, as shown in phantom in FIG. 6. This construction of the piston 36 and diaphragm 44 also would enable mounting within a filter bowl housing (not shown) of suitable transparence, such that a separate housing would not be required, further simplifying the device.

While the normal or non-indicating function is usually afforded by the absence of indication, there may also be provided, if desired, a normal indication such as shown in FIG. 7 in which cylindrical element 98 is mounted within the endcap receiving the compression spring 56 which projects towards the recess 60 in the piston 36, its exterior colored in a contrasting color such as green and which is enclosed upon movement of the piston 36 from the first to the second position such as to cause a change in colors.

It may also allow reversal of the piston movement, i.e., the piston 36 may be spring biased into a covering position, and be moved to an uncovered position upon development of the predetermined differential pressure. Appropriate reversal of coloring of these elements would thus provide the correct indication.

Referring to FIG. 8, magnifying ring 102 may be employed, the central opening 104 being defined by a series of semicircular protuberances 106 extending thereabout, enlarging the piston end 38 for greater visibility.

Figure 9:
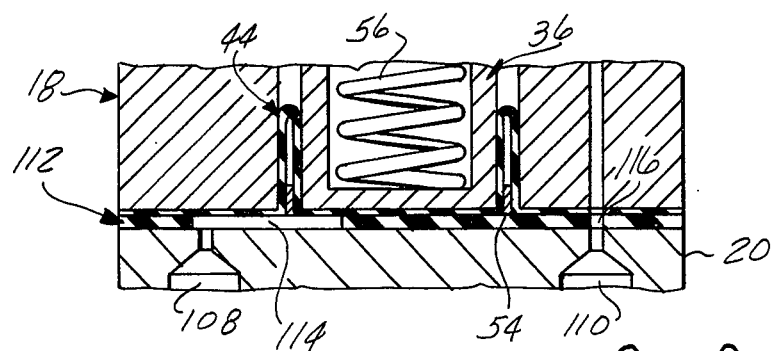
FIG. 9 is a fragmentary sectional view of an alternate embodiment of an indicator device according to the present invention, incorporating a spacer-porting plate to enable reversal of the high and low ports.
Figure 10:
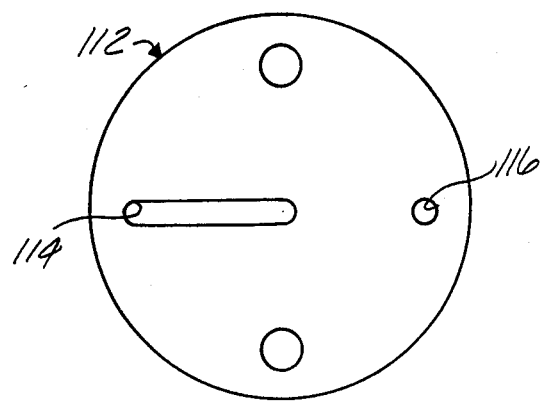
FIG. 10 is a plan view of the spacer-porting plate shown in FIG. 9.

Referring to FIGS. 9 and 10, it is sometimes desirable or necessary to enable reversal of the high and low pressure porting in a given filter design. In this case, symmetrical porting 108 and 110 enables reverse assembly of the indictor device 10 to a filter base 32. A porting ring 112 is formed with an elongated slot 114 and port 116. The slot 114 communicates the high pressure from either port 108 or 110 to the center, and port 116 communicates passage 118 with either port 108 or 110. This enables either port 108 or 110 to be high or low merely by repositioning of the device 10 with the porting ring 112.

Figure 11:
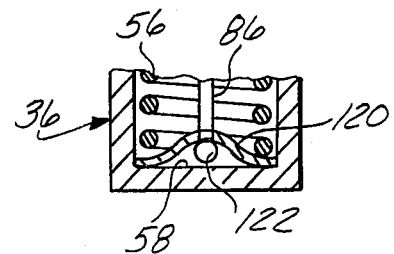
FIG. 11 is a fragmentary sectional view of the piston and spring with an alternate arrangement for mounting the valve stem to the piston.

Referring to FIG. 11, an alternate arrangement for drivingly engaging the piston 36 with the valve stem is shown. This includes a domed disc 120 positioned against the endwall 58 of the piston 36, with compression spring 56 in engagement therewith. The stem 86 is retained by a ball end 122 on the end of the stem 86, positioned beneath the domed disc 120. This causes the stem 86 to move together with the piston 36, while allowing a certain amount of "universal" motion to compensate for misalignment. In addition, this arrangement enables the valving 24 to be added as an option to a standardized piston 36.

Figure 12:
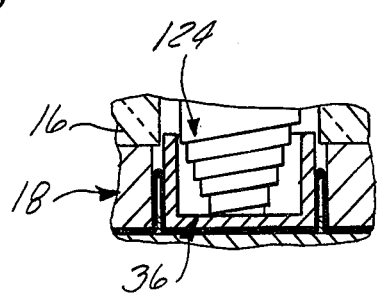
FIG. 12 is a fragmentary sectional view of the piston, with a volute spring installed therein.

Referring to FIG. 12, the compression spring may be provided by a volute spring 124, which may be colored to provide a normal indication, to function as an indicator element as well as bias means.

Figure 13:
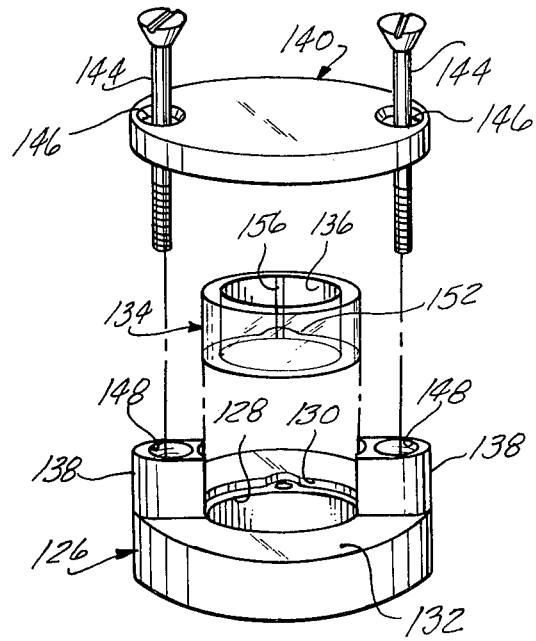
FIG. 13 is an exploded perspective view of certain of the components of an alternate embodiment of the present invention.
Figure 14:
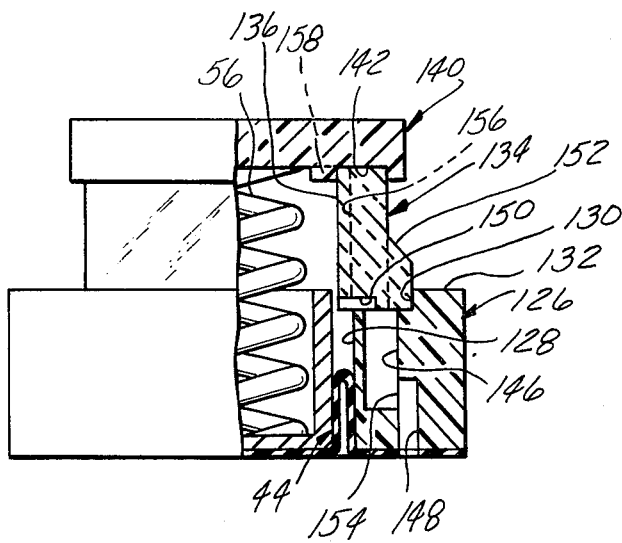
FIG. 14 is a partially sectional view across the minor axis of the differential pressure indicator embodiment of FIG. 13.
Figure 15:
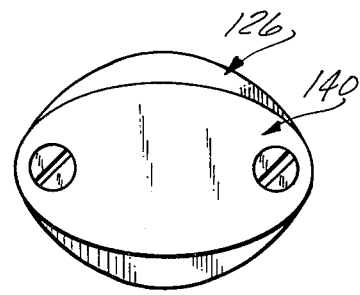
FIG. 15 is a top view of the differential pressure indicator shown in FIGS. 13 and 14.

FIGS. 13–15 show an alternate construction utilizing a smaller diameter ring for a given piston size while maintaining good visibility externally of the housing of the piston in its indicating position.

This includes a generally oval or elliptical opaque molded plastic body member 126 having an internal bore 128 formed therein within which is disposed the piston 36, movable therein between indicating and non-indicating positions. Sealing means are provided as in the other embodiments consisting of the diaphragm 44, enabling a differential pressure to be applied across the piston 36.

A bias spring 56 urges the piston 36 towards its non-indicating position. An annular recess 130 is formed into one end-face 132 of the body member 126. The recess 130 receives, and supports, a transparent ring 134 having a central opening 136 disposed to receive the piston 36 in its indicating position thereof and which are aligned on the major axis.

The body member 126 is formed with a pair of oppositely located projections 138 which extend alongside the transparent ring 134, and atop which is mounted a molded plastic endcap 140. The endcap has an annular recess 142 receiving and supporting the transparent ring 134.

The endcap 140 is affixed to the body member 136 by a pair of screws 144 extending through openings 146 in the endcap 140 and into openings 148 in the projections 138.

The screws 144 are adapted to either be received in a base (not shown) or directly into a filter housing (not shown) as in the above embodiments.

Passage means are similarly provided which enable application of the differential pressure across the piston 36. This then takes the form of a pair of offset bores 146 and 148 formed into opposite faces of the body member 126 and a relief slot 150 formed in the transparent ring 134.

A protuberant skirt section 152 is molded into the transparent ring 134 overlies the exit of bore 146 to seal the same upon cementing or welding in of the transparent ring 134.

The bores 146 and 148 are overlapped slightly to form a slot 154 along the intersection thereof. This construction allows low cost mold configuration to produce a jogged porting. The jog is desirable to locate the bore 148 radially outward to minimize sealing problems with the diaphragm, while the bore 146 is located radially in to minimize the size of the protuberant skirt 152.

An axial slot 156 may be formed into the bore 136 of the transparent ring 134 and a radial slot 158 through the wall of the recess 142 to enable free communication of fluid pressure past the piston 36 for valving versions as described above.

The oval shape of the body member and endcap allows a relatively efficient use of materials while allowing good visibility of the piston 36 in the ring 134. The ring 134 may be of smaller diameter, which is given good support against the pressure by recesses 130 and 142.

The size of the body member 136 at the same time allows good sealing of the diaphragm member 44 against the base or filter housing.

Accordingly, it can be seen that the objects of the invention as described above are achieved by the indicator device according to the present invention. Simplicity of the component parts are provided since each of the base, cap, body member and viewing ring are of simple configuration, able to be readily manufactured at low cost. At the same time, the device operates with a high degree of reliability with a minimum of internal friction such that the detection of the differential pressure condition of predetermined magnitude produces the indication and/or activation of the external fluid pressure to be exerted on the window to eliminate the need for a separate interposed coupling or other arrangement between the elements subjected to the differential fluid pressure and the indicator element. The same element, i.e., the piston, which is subjected to the differential fluid pressure also provides the indicator function to provide the extreme simplicity in configuration of the device.

Variations in the specifics of the device are, of course, possible within the scope of the appended claims, and the invention is, of course, not limited to the specific arrangement shown in the drawings and described herein.

I claim:

1. A differential pressure indicator for providing an indication upon detecting a predetermined differential pressure in a fluid system, comprising:
   a housing having a bore formed therein;
   a piston mounted for movement in said bore between a first and second position with a clearance space between said piston and bore;
   a diaphragm mounted across said bore, said diaphragm formed with a rolling lip disposed within said clearance space;
   means for applying said differential pressure across said diaphragm;
   said piston drivingly engaged with said diaphragm for movement together with the central portion of said diaphragm, said rolling lip received over the outside of said piston;
   bias means urging said piston to said first position with a force corresponding to the force generated by said predetermined pressure acting across said diaphragm;
   indicator means associated with said piston providing indication upon moving from said first to second position, said indicator means including valve means enabling communication of fluid pressure applied on one side of said diaphragm by said means applying said differential fluid pressure across said diaphragm to an outlet port upon movement of said piston to said second position; and,
   a pressure responsive indicator device responsive to development of said pressure at said outlet port;
   whereby movement of said piston from said first to second position provides said indication of said development of said predetermined differential pressure by said response of said indicator device.

2. The differential pressure indicator according to claim 1 wherein said indicator valve means includes a valve member, and a bore defining a valve seat, and means drivingly engaging said piston and said valve member for movement theretogether.

3. The differential pressure indicator according to claim 2 wherein said means drivingly engaging said piston and valve member comprises a valve stem connected to said valve member, and a domed disc, and wherein said piston is hollow and open-ended on said piston's leading end to form an endwall on said piston's trailing end in moving from said first to said second position, and wherein said domed disc is received within said piston, against said endwall, said bias means including a compression spring disposed within said piston and against said domed disc, said valve stem passing through said domed disc and retained therein with a ball end affixed thereto, whereby said valve member moves together with said piston by said engagement of said valve stem, valve member, and compression spring.

4. A differential pressure indicator for providing an indication upon detecting a predetermined differential pressure in a fluid system comprising:
   a housing having a bore formed therein;
   a piston mounted for movement in said bore between a first and second position with a clearance space between said piston and bore;
   a diaphragm mounted across said bore, said diaphragm formed with a rolling lip disposed within said clearance space;
   means for applying said differential pressure across said diaphragm, including a first chamber defined in part by said housing bore and in part by said diaphragm, and a second chamber defined in part by said housing and in part by the other side of said diaphragm, and passage means for introducing fluid pressure into said first and second chambers respectively, and reversible porting means for applying pressures received from external ports either to said first or second chambers, alternatively, whereby either high or low pressure may be received via said external porting;
   said piston drivingly engaging said diaphragm for movement together with the central portion of said diaphragm, said rolling lip received over the outside of said piston;
   bias means urging said piston to said first position with a force corresponding to the force generated by said predetermined pressure acting across said diaphragm;
   indicator means associated with said piston providing indication upon moving from said first to second position;
   whereby movement of said piston from said first to second position provides said indication of said development of said predetermined differential pressure.

5. The differential pressure indicator according to claim 4 wherein said porting means comprises a porting disc having an elongated slot port and an aperture port radially spaced on said disc adapted to be mounted to said housing to place said passage in alignment with said aperture port.

* * * * *